United States Patent

[11] 3,580,404

[72] Inventor William J. Moser
2075 Leaf Terrace, Coos Bay, Oreg. 97420
[21] Appl. No. 846,523
[22] Filed July 31, 1969
[45] Patented May 25, 1971

[54] LOADING RAMPS FOR TRAILERS
5 Claims, 7 Drawing Figs.
[52] U.S. Cl. .................................................. 214/85,
14/71
[51] Int. Cl. ..................................................... B60p 1/44
[50] Field of Search .......................................... 14/71;
214/85, 85.1; 105/436; 296/61

[56] References Cited
UNITED STATES PATENTS
3,142,394 7/1964 Schwartz .................... 214/85
3,516,560 6/1970 Brighton ...................... 214/85

*Primary Examiner*—Albert J. Makay
*Attorney*—James D. Givnan, Jr.

ABSTRACT: Ramp assemblies are disclosed mounted upon the rear of a lowboy-type trailer for loading construction equipment. Each assembly is of two hingedly attached sections collapsible to a raised, stowed positions by an arm engageable with both of the sections to lift same and to maintain same in a stowed position. A hydraulic circuit is included for selective control of each ramp assembly.

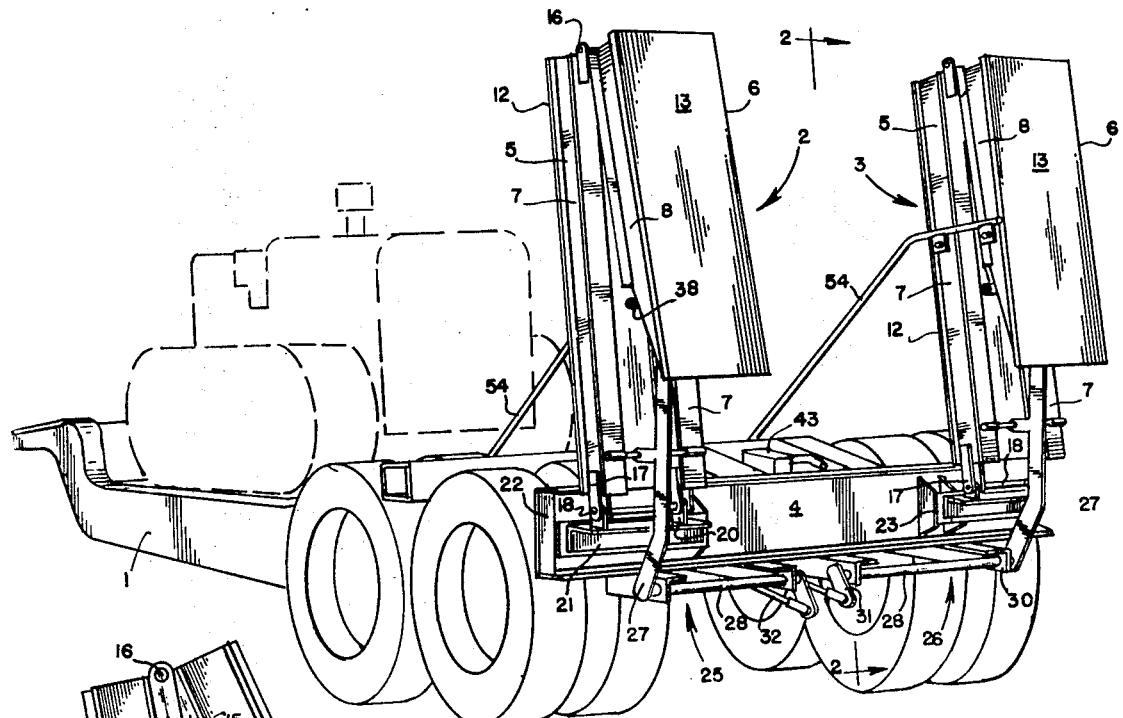
Fig. 1
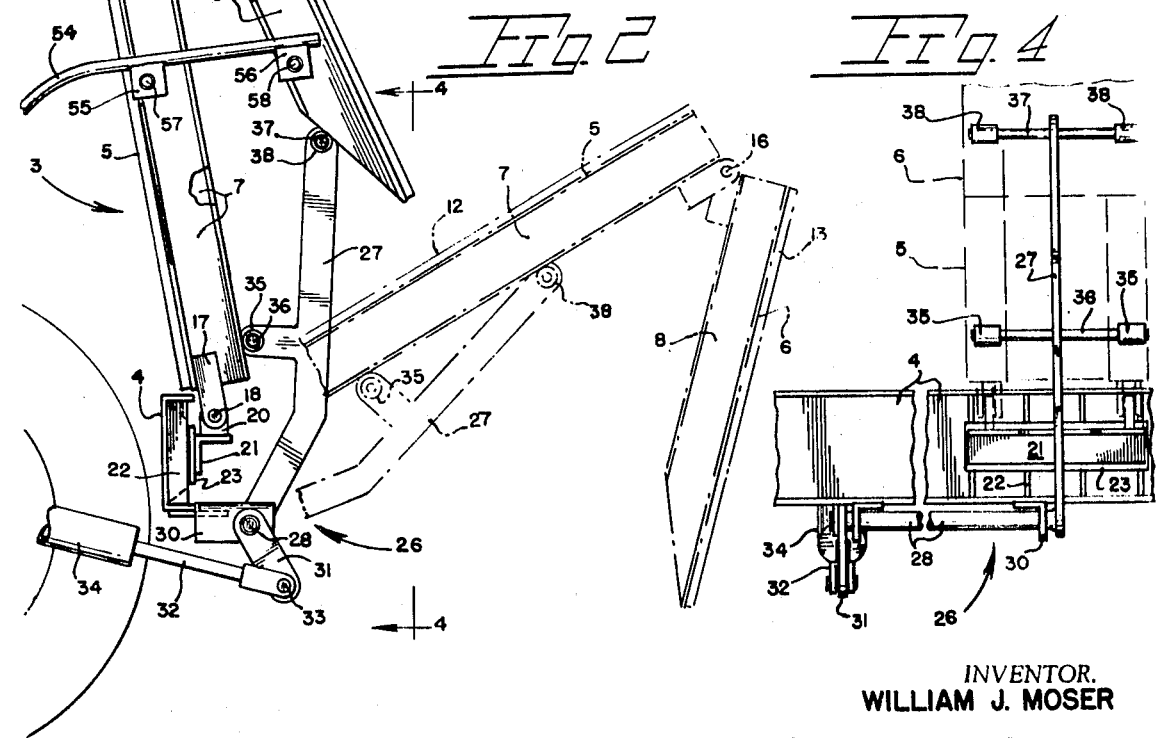
Fig. 2   Fig. 4
INVENTOR.
WILLIAM J. MOSER
BY 
AGENT

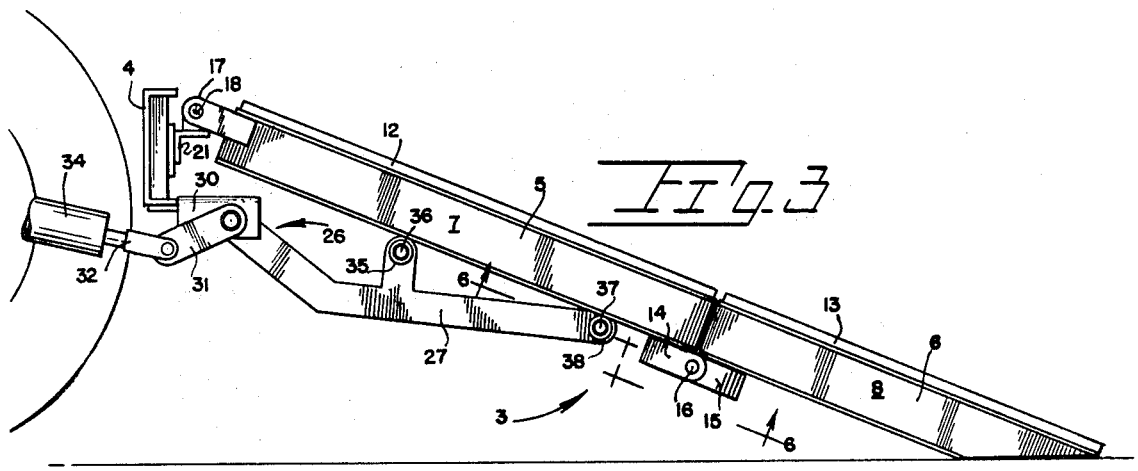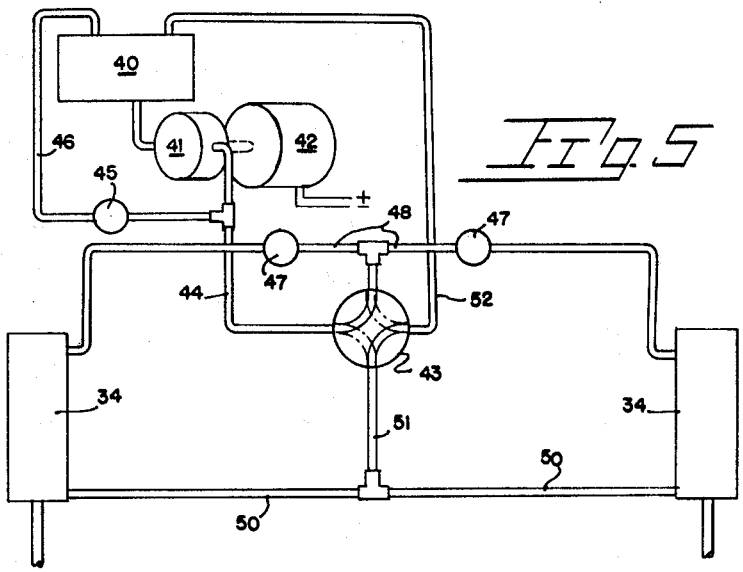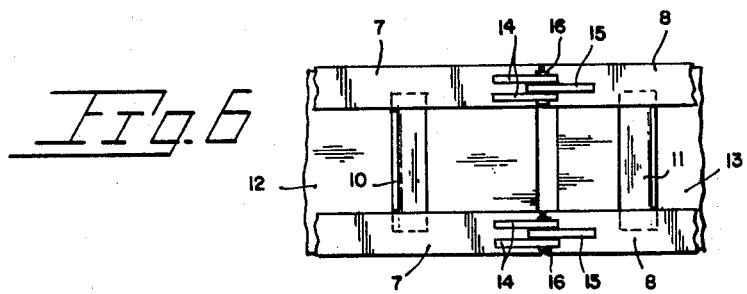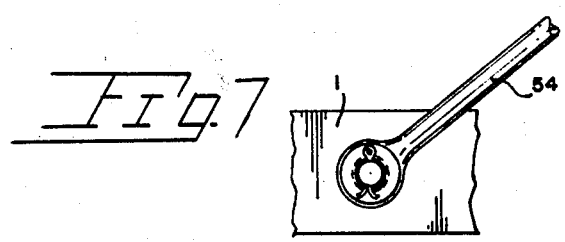

LOADING RAMPS FOR TRAILERS

BACKGROUND OF THE INVENTION

The present invention relates generally to loading ramp construction and more particularly to collapsible loading ramps hingedly mounted on a trailer for loading of heavy construction equipment.

Heavy construction equipment is most commonly transported from one work site to another by means of a trailer known as a lowboy trailer which is characterizes by a low equipment carrying bed. The loading and off-loading of such equipment has to a large extent been accomplished by the use of heavy timbers or beams placed in an inclined manner against the rear of the trailer. The construction equipment such as for example, a crawler-type tractor, is then driven onto or off the trailer along the inclined timbers. The timbers as so used are necessarily of substantial weight and size, making for inconvenient storage on the trailer and require at least two men for handling. Further such timbers reduce the trailer's capacity and must be manually placed in position prior to the loading and unloading of equipment. Such handling and placement of the timbers presents a considerable hazard to the workmen involved and if not properly placed, can result in damage to the equipment being loaded.

Further, the common use of wooden timbers creates a hazard by reason of being carelessly subjected to weights for which they are not capable of supporting. While fabricated metal ramps provide limited advantages over wooden timbers they are still subject to requiring manual effort for placement.

SUMMARY OF THE INVENTION

The invention is embodied in loading ramps hingedly mounted to an equipment carrying trailer in a permanent manner for transport with the trailer. Novel lifting means provides for ramp operation in an efficient and rapid manner in conjunction with a hydraulic control circuit permitting exact ramp control.

An important object of the invention is to provide loading ramps capable of being operationally disposed by a single workman, in most cases the driver of the trailer tractor, for the rapid and safe off or on loading of heavy construction equipment.

The ramps are suited for use on rough or uneven ground as is often encountered in construction areas.

Continuing with objects of the instant invention, the problems attendant stowing for transport beams or timbers useable as ramps are obviated. Also avoided by the present ramp construction are the hazardous manual placement of loosely carried beams or timbers. The ramp members further may be secured against the undesired movement when inoperatively disposed.

BRIEF DESCRIPTION OF THE DRAWINGS

With attention to the accompanying drawings:

FIG. 1 is a perspective view of the rear end of a trailer with the present invention installed in place thereon, FIG. 2 is a side elevational view of one ramp assembly taken along a vertical section line indicated at 2–2 in FIG. 1, FIG. 3 is a view similar to FIG. 2 but with the ramp operatively disposed in ground contact, FIG. 4 is a vertical end view of the ramp assembly taken along line 4–4 of FIG. 2 with the ramp members shown in dashed lines for purposes of illustration, FIG. 5 is a hydraulic circuit schematic for ramp operation and FIG. 6 is a view of the ramp sections taken upwardly along line 6–6 at FIG. 3, FIG. 7 is a view of a mechanical lock for each ramp.

DESCRIPTION OF PREFERRED EMBODIMENT

With continuing reference to the drawings wherein reference numerals indicate parts similarly identified in the following specification, the reference numeral 1 indicates a heavy equipment carrying trailer shown as a lowboy type of trailer. The trailer shown provides a base for the attachment of the ramp structure and in no way is use of the invention restricted to such type of trailer.

The ramp structures are indicated generally at 2 and 3 each being independent of the other and located at the rear of the trailer at opposite sides thereof. In trailers of the lowboy-type shown, a beam as at 4 extends crosswise of the trailer constituting the trailer's bumper. This beam is conventionally of heavy steel construction to support the ends of timbers or beams rested thereagainst during equipment loading operations. Most usually a channel-shaped beam, as shown, is utilized.

Since each of the ramp assembly 2 and 3 are essentially similar the following description will relate, for the sake of convenience, to but one of the said assemblies. A main or inner ramp section indicated at 5 hingedly carries an outer ramp section 6. Each ramp section comprises pairs, of spaced apart, parallel I-beams indicated at 7 in the main ramp and at 8 in the outer ramp. As typically shown in FIG. 6 the I-beams of the main ramp are secured apart by spacers 10 while spacers 11 serve to similarly space apart I-beams 8 of the outer ramp. Attraction surface 12 and 13 such as wood planking is bolted to the upper flanges of the I-beams. Hinge plates at 14 and 15, carried on the underside of I-beams 7 and 8 respectively, are pinned at 16 to provide a hinged connection between the ramp sections.

Attaching the main section of ramp to the trailers beam or bumper 14 are hinge plates 17 pairs of which project outwardly from each I-beam 7 to receive a hinge pin 18. Mounting the hinge pin are ears 20 in turn carried by a bracket 21. Webs 22 are welded within the channel shaped beam 4 and support a plate 23 to which the bracket 21 may be bolted. If desired the plate 23 may be apertured to receive bolts mounting the bracket in various positions relative to the vehicle centerline and hence spacing of the two ramp assemblies.

For each ramp assembly I show an independent operating means generally at 25 and 26 to enable the operator to precisely locate each assembly in the down position. Again since the operating mechanisms are substantially similar the description will be directed to but one thereof. An arm unit at 27 is swingably carried by a torque transmitting shaft 28 the latter journaled within brackets 30 affixed to the underside of the trailers beam 4. A crank arm 31 for shaft 28 is affixed to the shaft's inner end and receives the end of a piston rod 32 in pinned attachment at 33. A double acting hydraulic cylinder at 34 is swingably mounted at its base end in any acceptable manner to the trailer chassis to permit slight accurate movement of the cylinder in a vertical path upon actuation thereof.

With attention again to the arm units 25 and 26, a first pair of roller components at 35 are contactable with the main or inner ramp section 5. The rollers are mounted on a crosswise disposed carrier 36 which locates each roller 35 for rolling engagement with the lowermost flange of the two I-beams 7. At the outer end of the arm unit a second carrier 37 mounts a second or outer pair of similar roller components 38 operationally contactable with both the main ramps 5 and the outer ramps 6. In the raised, or stowed position, of the arm unit the first rollers 35 (as shown in FIG. 2) bear against the lower flanges of I-beams 7 while the rollers 38 support and position the outer ends of the I-beams 8 of the outer ramp section. As shown in FIG. 2 in broken lines, at approximately 70° from the ramp assemblies stowed position the outer rollers 38 will come into supporting engagement with the I-beams 7 of the main ramp and remain so until the arm unit and ramp assembly have reached their lowermost position as shown in FIG. 3.

In raising of the ramp assembly the outer or second pair of roller components 38 will contact the I-beams of the main ramp section 5 to initiate their upward movement. During the upward travel of the ramp assembly, approximately halfway, the first pair of roller components 35 will engage and bias the main ramp section into a stowed position with the outer roller components 38 positioning the outer ramp section.

With regard to he hydraulic system shown in the schematic of FIG. 5, a reservoir 40 supplies the intake side of a positive displacement pump 41 driven by an electric motor 42 in circuit with an electrical source. The pressure side of the pump feeds to a manual four way selector valve 43 via conduit 44. A bypass line 46 with an adjustable pressure relief valve 45 protects the circuit from excessive pressures. To raise the ramps from their operative positions the selector valve 43 is placed in the full line position to direct a pressure flow selectively to one of the cylinders 34. Control valves 47 in the branched line 48 permit directing the flow to one cylinder at a time to accomplish successive ramp raising. The cylinder activated exhausts fluid during ramp raising, via line 50 which tees into a common line 51 with the flow returning to the tank via line 52 through selector valve 43.

To lower the ramps individually allowing precise placement on uneven ground, the selector valve is moved to align the ports as shown in broken lines. Again the control valves are alternately opened and closed to control exhausting of fluid from cylinders 34. Pump flow is directed into the rod end of the two cylinders and by reason of the alternate open and closed positioning of controls valves 47 only one cylinder may exhaust back through the selector valve and ultimately back through the return line 52 of the reservoir. Reversal of the positions of the valves will cause the remaining extended cylinder to retract its rod and permit lowering of its associated ramp assembly.

In addition to the ramp assemblies 2 and 3 being held in a raised, locked position by means of a hydraulic lock effected through positioning of the selector valve and the control valves to an "off" position, a mechanical lock is provided in the form of rearwardly extending locks 54 for each ramp. Ears 55—56 depending from the lock are apertured to receive studs 57—58 welded to the I-beams. Each stud receives a locking pin to prevent separation during trailer movement. Each lock is pivotally attached to the trailer chassis for primarily vertical movement to permit placement of the ears 55—56 over the studs.

Having thus described the invention what I desire to secure by Letters Patent is:

I claim:

1. In combination with a heavy equipment carrying trailer, a pair of ramp assemblies for loading and unloading such equipment with each ramp assembly comprising:

a main ramp section and an outer ramp section hingedly linked at their common ends and the main ramp section swingably mounted at its other end to the rear of the trailer, a ramp operating means including an arm unit subjacently disposed to the ramps for vertical movement by a hydraulic cylinder for raising and for lowering of the ramp sections, and said arm unit comprising an elongate arm having a first pair of components intermediate the ends of the arm contactable with the main ramp section and a second pair of components carried at the outer end of said arm and also contactable with the main ramp section to advantageously impart initial lifting movement to the main ramp whereupon subsequent to the initial lifting movement of the main ramp section said first pair of components will complete the lifting thereof while said second components will contact the outer ramp section to retain same in spaced relationship to the main ramp section for ramp assembly stowing during transport of the trailer.

2. The invention as claimed in claim 1 wherein said first and second pairs of components are rollers for rolling engagement with the underside of the ramp sections.

3. The invention as claimed in claim 1 wherein the hydraulic cylinder of each ramp operating means is in a hydraulic circuit including separate valve controls for each of said cylinders for individual operation of each ramp assembly, independently operable to raise and lower their associated ramp sections in sequence.

4. The invention as claimed in claim 1 wherein said elongate arm is of a length to locate said second pair of components adjacent the outermost end of the main ramp section when the latter is operatively disposed in a lowered position whereby efficient leverage is achieved during initial movement of the ramp sections.

5. The invention as claimed in claim 1 wherein a mechanical lock comprising an elongate member attached at one of its ends to he trailer chassis and is adapted for engagement at its opposite end with the ramp sections of a ramp assembly to retain same in a raised stowed position.